May 21, 1963  C. W. SINCLAIR  3,090,114
METHOD OF MAKING A BRAKE DRUM
Filed Dec. 29, 1958
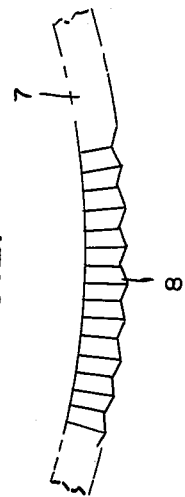
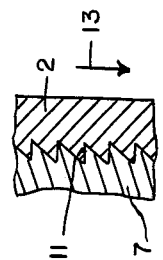
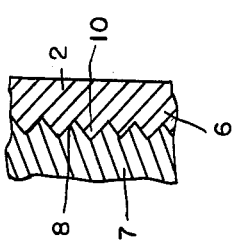
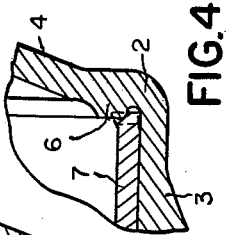
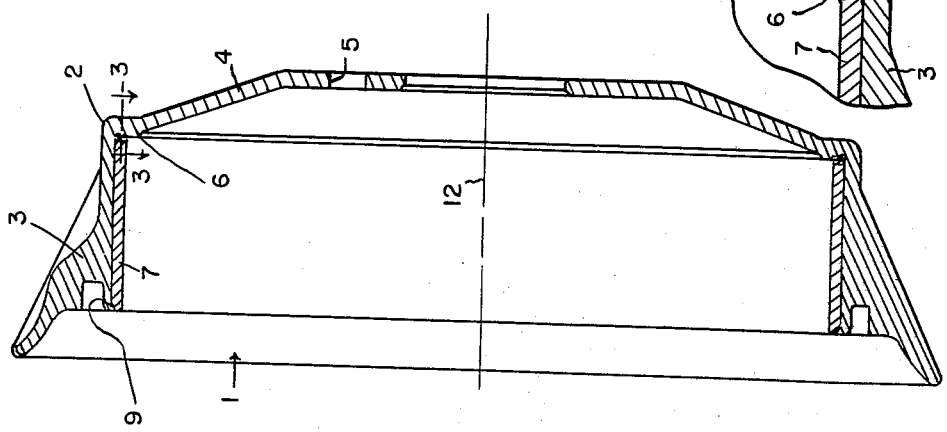
INVENTOR.
CHARLES W. SINCLAIR
BY
Whittemore, Hulbert & Belknap
ATTORNEYS

United States Patent Office 3,090,114
Patented May 21, 1963

3,090,114
METHOD OF MAKING A BRAKE DRUM
Charles W. Sinclair, Detroit, Mich., assignor to Kelsey-Hayes Company, Detroit, Mich., a corporation of Delaware
Filed Dec. 29, 1958, Ser. No. 783,490
5 Claims. (Cl. 29—447)

This invention relates to brake drums for motor vehicle wheels and refers more particularly to brake drums of the type having a shell and a liner and a method of making the same.

The invention has for one of its objects to provide a method of making a brake drum having a shell provided with a flange and a brake liner for the flange mechanically locked against movement relative to the shell.

The invention has for another object to provide a method of making a brake drum having a shell provided with a flange and a transverse web, and a brake liner for the flange mechanically locked against rotation relative to the shell by means including interlocking serrations on the inner end of the liner and on the web of the shell.

The invention has for a further object to provide a method of making a brake drum as described above in which the liner is received within the flange with an interference fit and the flange and liner have axially overlapping portions to prevent axially outward movement of the liner relative to the shell.

Other objects and features of the invention will become apparent as the description proceeds, especially when taken in conjunction with the accompanying drawing, illustrating a preferred embodiment of the invention, wherein:

FIGURE 1 is a radial sectional view of a brake drum embodying the invention.

FIGURE 2 is a fragmentary elevation of the brake liner.

FIGURE 3 is a sectional view on the line 3—3 of FIGURE 1.

FIGURE 4 is an enlargement of a portion of FIGURE 1, and

FIGURE 5 is similar to FIGURE 3 but shows a modification.

Referring now more particularly to the drawing, the brake drum is generally indicated at 1 and comprises a cast shell 2 having an integral annular flange 3 and a web 4 extending generally transversely of the flange. The web is centrally apertured and the radially inner portion thereof is formed with a series of holes 5 arranged in a circle to receive fasteners for securing the shell to an axle flange or a hub flange. The web is formed with an integral annular rib 6 near the flange 2 which projects axially outwardly or to the left and terminates in a plane surface at right angles to the axis of the drum. The shell is cast of aluminum or magnesium, which are relatively lightweight metals and have high heat transfer characteristics. While aluminum or magnesium are preferred, other materials having similar characteristics may be employed.

The annular brake liner 7 is formed of cast iron and has an outside radius which is approximately .060" greater, before assembly with the shell, than the inside radius of the flange 3. The liner is formed with a series of generally V-shaped serrations 8 which extend continuously along the axially inner end of the liner throughout the full 360° thereof. The axially outer end of the liner is beveled to provide a radially inwardly and axially outwardly inclined annular surface 9.

The liner is assembled with the shell by first contracting the liner by cooling to approximately —40° F. and expanding the shell flange by heating to approximately 300° F. The contracted liner is then inserted within the expanded brake flange in an axially inward direction or to the right with its serrated inner end first. The liner and flange, being contracted and expanded, have practically a line-to-line contact so that the liner may be pressed in without difficulty. The liner, which is formed of a harder material than the shell, is pressed axially inwardly with sufficient force to cause the serrations to penetrate or bite into the softer metal of the rib 6 and embed themselves in the rib to provide a mechanical interlock, as shown in FIGURE 3, opposing relative rotation between the shell and liner. The metal on the rib will flow into the spaces between the serrations of the liner during the assembly of the liner and shell so that in effect the rib also has serrations 10 which interlock with the serrations on the liner.

Thereafter the axially outer end of the drum flange is swedged over the beveled surface 9 of the liner to prevent the liner from axially outward movement relative to the shell. In this way it is positively assured that the serrations will not become disengaged.

After the liner and shell have returned to room temperature, the liner will have approximately a .060" interference or shrink fit with the flange. The shrink fit frictionally resists any tendency of the liner to move relative to the shell.

FIGURE 5 shows a modification in which the serrations on the liner each have one face 11 which extends axially and is disposed in a plane containing the drum axis 12. Assuming the drum rotates in the direction of the arrow 13 during forward movement of the vehicle with which the drum is associated, the axial faces of the serrations will positively resist any relative rotation between the shell flange and liner when the brake is applied without setting up forces tending to cam the liner axially outwardly or in a direction away from the rib 6 of the shell. Otherwise the liner and drum of FIGURE 5 are exactly like FIGURES 1-4 and are assembled in the same way to embed the serrations in the softer metal of rib 6.

What I claim as my invention is:

1. A method of assembling a brake drum liner and shell comprising the steps of providing an annular liner having first and second ends and a smooth cylindrical outer surface extending between said ends and having on said first end a series of circumferentially spaced radially extending locking formations projecting axially from said first end, providing a shell of a material softer than said liner including an annular flange having inner and outer ends and a smooth cylindrical inner surface extending between said ends thereof adapted to concentrically receive said liner in surface-to-surface contact with the cylindrical outer surface of said liner and also including a transverse web integrally connected to the inner end of said flange and having an annular surface extending radially inwardly from the inner surface of said flange, axially inserting the first end of said liner concentrically within the outer end of said flange in an axially inward direction relative to said flange by the application of pressure on said liner directed axially inwardly relative to said flange to place the cylindrical surfaces of said liner and flange in surface-to-surface contact and to place the locking formations on the first end of said liner in contact with the radially inwardly extending surface of the web of said shell, embedding said locking formations in the radially inwardly extending surface of the web of said shell by the further application of pressure on said liner directed axially inwardly relative to said flange to oppose relative rotation between said shell and liner, and upsetting the outer end of said flange to form an interlock with the second end of said liner and mechanically oppose axially outward movement of said liner relative to said flange.

2. The method defined in claim 1, wherein the locking formations are in the form of a series of V-shaped serrations which extends continuously along the first end of said liner throughout the full 360° thereof, wherein the crests of said serrations define sharp radially extending edges, and wherein said liner is inserted within said flange and the serrations are embedded in the radially inwardly extending surface of the web of said shell in one continuous operation.

3. The method defined in claim 2, wherein one side of each serration is disposed in a plane containing the shell axis.

4. The method defined in claim 2, wherein the sides of each serration extend at an acute angle to and on opposite sides of a plane through the serration crest containing the shell axis.

5. The method defined in claim 1, wherein said liner is dimensioned normally to have an interference fit with said flange, and wherein prior to the axial insertion of said liner within said flange, said flange and liner are relatively heated and cooled respectively to expand and contract the same and thereby facilitate the insertion of said liner within said flange.

References Cited in the file of this patent

UNITED STATES PATENTS

| | | |
|---|---|---|
| 1,716,144 | Morrison | June 4, 1929 |
| 1,868,740 | Frank | July 26, 1932 |
| 1,911,430 | Cautley | May 30, 1933 |
| 1,974,949 | Campbell | Sept. 25, 1934 |
| 1,989,211 | Norton | Jan. 29, 1935 |
| 2,109,155 | Sekella | Feb. 22, 1938 |
| 2,486,769 | Watson | Nov. 1, 1949 |

FOREIGN PATENTS

| | | |
|---|---|---|
| 694,905 | Great Britain | July 29, 1953 |